(12) United States Patent
Jacobus et al.

(10) Patent No.: US 12,298,149 B2
(45) Date of Patent: *May 13, 2025

(54) SYSTEM AND METHOD FOR GENERATING PRECISE ROAD LANE MAP DATA

(71) Applicant: Cybernet Systems Corp., Ann Arbor, MI (US)

(72) Inventors: Charles J. Jacobus, Brighton, MI (US); Glenn J. Beach, Grass Lake, MI (US); Douglas Haanpaa, Ann Arbor, MI (US); Charles J. Cohen, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,752

(22) Filed: Jan. 22, 2024

(65) Prior Publication Data

US 2024/0159559 A1    May 16, 2024

Related U.S. Application Data

(63) Continuation of application No. 17/120,210, filed on Dec. 13, 2020, now Pat. No. 11,920,950, which is a
(Continued)

(51) Int. Cl.
*G01C 21/00*  (2006.01)
*G01C 21/16*  (2006.01)
(Continued)

(52) U.S. Cl.
CPC ..... *G01C 21/3848* (2020.08); *G01C 21/1656* (2020.08); *G01C 21/3815* (2020.08);
(Continued)

(58) Field of Classification Search
CPC ............ G01C 21/3848; G01C 21/1656; G01C 21/3815; G01C 21/3841; G01C 21/00;
(Continued)

(56) References Cited

U.S. PATENT DOCUMENTS 8,892,356 B1 *  11/2014  Weiland ............... B60W 50/14
                                                     701/454
10,895,460 B2 *   1/2021  Jacobus ............. G01C 21/3848
(Continued)

*Primary Examiner* — Shardul D Patel
(74) *Attorney, Agent, or Firm* — Fishman Stewart PLLC

(57) ABSTRACT

An in-vehicle system for generating precise, lane-level road map data includes a GPS receiver operative to acquire positional information associated with a track along a road path. An inertial sensor provides time local measurement of acceleration and turn rate along the track, and a camera acquires image data of the road path along the track. A processor is operative to receive the local measurement from the inertial sensor and image data from the camera over time in conjunction with multiple tracks along the road path, and improve the accuracy of the GPS receiver through curve fitting. One or all of the GPS receiver, inertial sensor and camera are disposed in a smartphone. The road map data may be uploaded to a central data repository for post processing when the vehicle passes through a WiFi cloud to generate the precise road map data, which may include data collected from multiple drivers.

20 Claims, 7 Drawing Sheets

Related U.S. Application Data continuation of application No. 15/804,488, filed on Nov. 6, 2017, now Pat. No. 10,895,460.

(51) Int. Cl.

| | | |
|---|---|---|
| *G01S 19/48* | (2010.01) | |
| *G05D 1/00* | (2006.01) | |
| *G05D 1/246* | (2024.01) | |
| *G01S 19/13* | (2010.01) | |
| *G01S 19/41* | (2010.01) | |
| *G05D 1/248* | (2024.01) | |
| *G05D 1/249* | (2024.01) | |

(52) U.S. Cl.
CPC ........ *G01C 21/3841* (2020.08); *G01S 19/485* (2020.05); *G05D 1/0274* (2013.01); *G05D 1/246* (2024.01); *G01S 19/13* (2013.01); *G01S 19/41* (2013.01); *G05D 1/0246* (2013.01); *G05D 1/027* (2013.01); *G05D 1/0278* (2013.01); *G05D 1/248* (2024.01); *G05D 1/249* (2024.01)

(58) Field of Classification Search
CPC ........ G01S 19/485; G01S 19/13; G01S 19/41; G05D 1/0274; G05D 1/246; G05D 1/0246; G05D 1/027; G05D 1/0278; G05D 1/248; G05D 1/249
USPC .......................................................... 701/445
See application file for complete search history.

(56) References Cited

U.S. PATENT DOCUMENTS

| | | | |
|---|---|---|---|
| 11,920,950 B2* | 3/2024 | Jacobus | G01C 21/3815 |
| 2003/0072471 A1* | 4/2003 | Otsuka | G06V 10/44 |
| | | | 382/103 |
| 2008/0056535 A1* | 3/2008 | Bergmann | G06V 10/44 |
| | | | 701/532 |
| 2010/0086174 A1* | 4/2010 | Kmiecik | G06T 7/90 |
| | | | 382/199 |
| 2013/0266175 A1* | 10/2013 | Zhang | G06V 10/457 |
| | | | 382/103 |
| 2016/0264003 A1* | 9/2016 | Yokoyama | B60L 15/2009 |
| 2017/0341653 A1* | 11/2017 | Kubota | B60W 50/0097 |
| 2018/0259972 A1* | 9/2018 | Heo | B60W 30/00 |
| 2018/0299288 A1* | 10/2018 | Herbst | G10L 15/22 |
| 2019/0145794 A1* | 5/2019 | Ketchell, III | G01C 21/3667 |
| | | | 701/439 |
| 2019/0250632 A1* | 8/2019 | Agarwal | G05D 1/027 |
| 2019/0360820 A1* | 11/2019 | Svensson | G01C 21/3848 |
| 2020/0132476 A1* | 4/2020 | Roeth | G01C 21/3819 |

* cited by examiner

SYSTEM AND METHOD FOR GENERATING PRECISE ROAD LANE MAP DATA

REFERENCE TO RELATED APPLICATIONS

This application is a continuation of U.S. application Ser. No. 17/120,210, filed Dec. 13, 2020, which is a continuation of U.S. application Ser. No. 15/804,488, filed Nov. 6, 2017, the entire contents of which are incorporated herein by reference.

FIELD OF THE INVENTION

The invention related generally to autonomous or driverless vehicles and, in particular to a system and method for generating precise lane map data.

BACKGROUND OF THE INVENTION

There are three approaches being pursued to implement Level 4 or 5 vehicle autonomy (driverless operation of the vehicle), according to SAE Automated Driving in Standard J3016. The first is adaptive lane detection and keeping, the second is using precision GPS (DGPS or equivalent) augmented by inertial sensing, to keep the vehicle in the lane by referencing to precision GPS coordinate maps of each lane in a road segment, and the third is using 3D simultaneous localization and mapping, typically using 3D range sensing, to correlate vehicle position relative to surrounding pre-mapped terrain features (road berms, buildings, barriers, etc.).

In the first case, the problem is that computer vision to detect road or lane boundaries is not possible for all drivable lanes. Sometimes white or yellow lines marking lanes are indistinct, sometimes they are obscured by weather (ex: snow rain, dirt) or by other obstructions (road work, other vehicles parked by the side of the road, etc.), and sometimes lighting conditions are not favorable (sun in the image washes out all other content, it is too dark out, etc.).

The second case requires precision maps of roadways down to the lane, perhaps accurate to 2 cm to 10 cm (a tire width). This is too accurate for aerial and satellite based road mapping and requires that each and every road be so mapped).

In the third case, we have the same problem as in the second case. One-hundred percent of the road surround has to be mapped to 2 cm to 10 cm accuracy, and that data is subject to changes in the surrounding areas (roadwork, new building construction, seasonal changes in foliage density, and other effects that are not likely to be well controlled).

In our analysis, the primary Level 4/5 control or and third approaches it will be necessary to know lane positions in Earth (GPS) coordinates to the precision required by the second approach for every path that is potentially autonomously driven.

SUMMARY OF THE INVENTION

An in-vehicle system for generating precise, lane-level road map data includes a GPS receiver operative to acquire positional information associated with a track along a road path, and wherein the positional information has an accuracy. An inertial sensor provides time local measurement of acceleration and turn rate along the track, and a camera acquires image data of the road path along the track. A processor is operative to receive the local measurement from the inertial sensor and image data from the camera over time in conjunction with multiple tracks along the road path, and improve the accuracy of the GPS receiver through curve fitting.

In accordance with a preferred embodiment, one or all of the GPS receiver, inertial sensor and camera are disposed in a smartphone. The camera may be a look-ahead or look-behind camera, and the inertial sensor provides time local measurement of acceleration and turn rate in three dimensions. The processor is operative to solve for vehicle position as follows:

$$\text{Position}(P_X P_Y P_Z) = \Sigma_t(\Sigma_t\{A_x A_y A_z\} + V_O) + P_O; \text{ and}$$

$$\text{Driving Direction}(\alpha_O \beta_O \gamma_O) = \Sigma_t\{d_\alpha d_\beta d_\gamma\} + [\alpha_O \beta_O]$$

where $P_O$ and $V_O$ were respectively the last known good position update and the last known velocity update for the vehicle, and $A_x$, $A_y$ and $A_z$ are measured acceleration over time; $[\alpha_O \beta_O \gamma_O]$ are the last known good heading, and $d_\alpha d_\beta d_\gamma$ the three measure heading change gyro measurements.

The system is operative to generate precise road map data based upon the improved accuracy of the GPS receiver. The system may further include a transmitter for transmitting the road map data to a central data repository for post processing to generate the precise road map data, which may include lane locations within roads based upon data collected from multiple drivers. The road map data may be uploaded to a central data repository for post processing when the vehicle passes through a WiFi cloud.

The road map data may include paths around transient road features, enabling the road map data to be updated for multiple vehicles in accordance with the transient road features. Such transient road features may include construction sites, traffic diversions, or newly opened road or lane paths. The vehicle may be an autonomous or "driverless" vehicle.

Corresponding methods for generating precise, lane-level road map data are also disclosed herein.

DETAILED DESCRIPTION OF THE INVENTION

Figure 1:
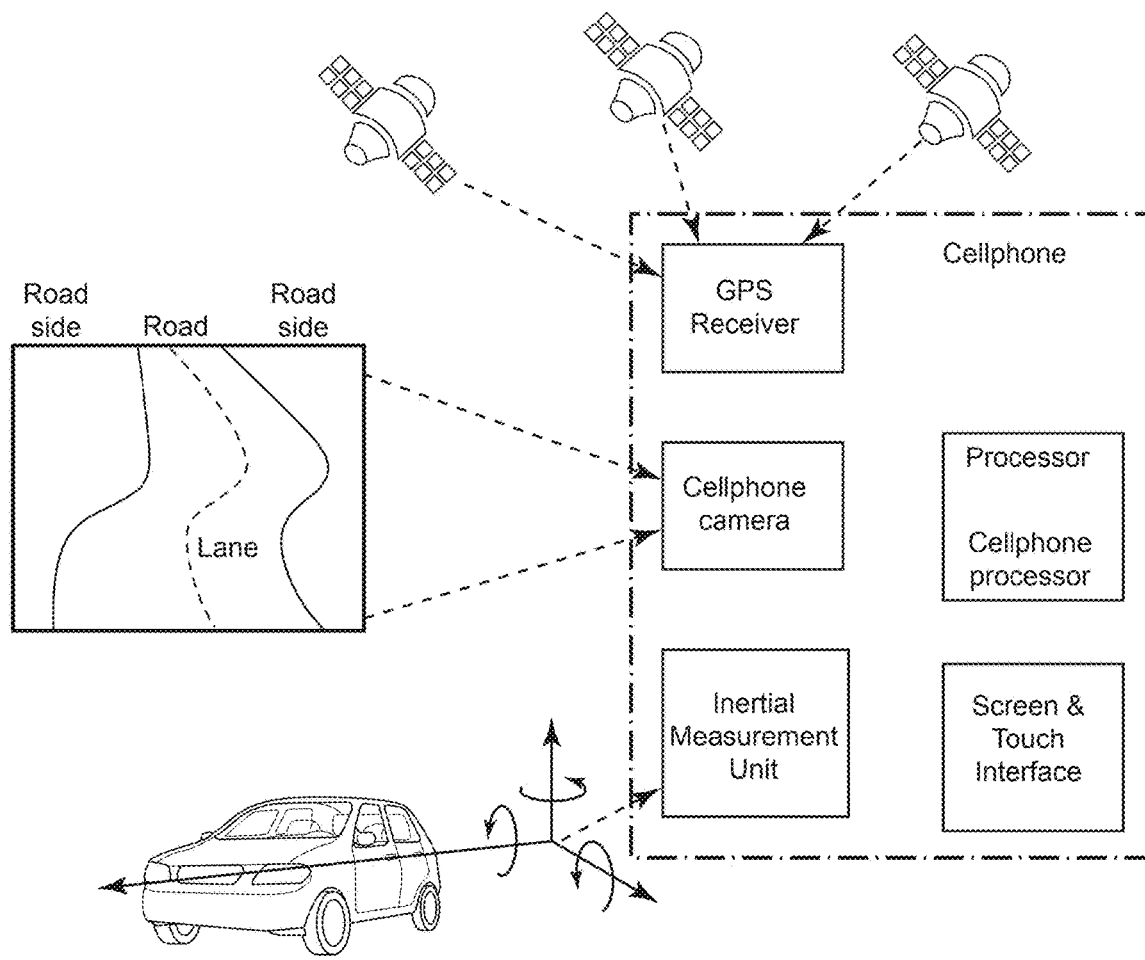
FIG. 1 depicts the internal GPS unit of a cellphone, or less expensive GPS receiver, along with two additional data sources.

In broad and general terms, this invention acquires lane-level precise road map data in a cost efficient manner. Typical phone or vehicle based GPS receivers provide 5-8 meter circular error probability (CEP) accuracy. What is needed for precision autonomous drive applications is nominally 10 cm or 4 inches (about ½ a tire width—although one might get by with less accuracy on wider road lanes).

There are two basic ways to achieve better location accuracy. One method is to employ RTK (Real Time Kinematics) or DGPS (Differential GPS) correction leading to accuracies of 2 to 20 cm CEP. The other method is to take advantage of knowing that GPS is a random walk error within its CEP, so more data points of nominally the same location will improve accuracy by nominally $1/\sqrt{n}$, where n is the number of points. More n points are available if more independent GPS receivers are used (4 receivers improve accuracy by about a factor of 2 so four 5 meter GPS units are effectively a 2.5 meter system). It takes about a factor of 25 to obtain a ⅕ meter GPS error down to a ⅕ meter error (20 cm) or nominally 625 points (with a 10 point per second system that is about 1 minute of data).

While standing still performing surveying, DGPS, RTK, or point averaging is practical. However, in a moving vehicle with only a 5 meter GPS on-board, all approaches have issues. RTK and DGPS units are not presently available on phones or for less expensive GPS receivers. Furthermore, RTK requires a reference unit (which is often available over the Internet, but may not be), and DGPS requires a satellite subscription service. Point averaging requires either long standing still periods or a way to fit curves to GPS data streams so that more points can be accounted for in a fitting process. This approach is most often used in post processing GPS data.

In our approach, we use the internal GPS unit of a cellphone or less expensive GPS receiver along with two additional data sources [FIG. 1]. The first data source is the internal inertial sensors of the phone (or low cost add-in inertial measurement unit, IMU), and the second source is the lane track from a look-a-head (and/or look-behind) camera (typically the one mounted on the rear side of the phone, but could also be a front looking camera mount on the front or rear of the vehicle). A look-a-head camera feeds image data to a processing system that identifies the camera's (and therefore the vehicle's) position within the road lane. The IMU provides time local measurement of acceleration and turn rate in three dimensions where:

Position$(P_X P_Y P_Z) = \Sigma_t(A_t\{A_x A_y A_z\} + V_O) + P_O$; and

Driving Direction$(\alpha\beta\gamma) = \Sigma_t\{d_\alpha d_\beta d_\gamma\} + [\alpha_O \beta_O \gamma_O]$ where $P_O$ and $V_O$ were respectively the last known good position update and the last known velocity update for the vehicle, and $A_x$, $A_y$ and $A_z$ are measured acceleration over time. $[\alpha_O \beta_O \gamma_O]$ are the last known good heading, and $d_\alpha d_\beta d_\gamma$ the three measure heading change gyro measurements.

Figure 2:
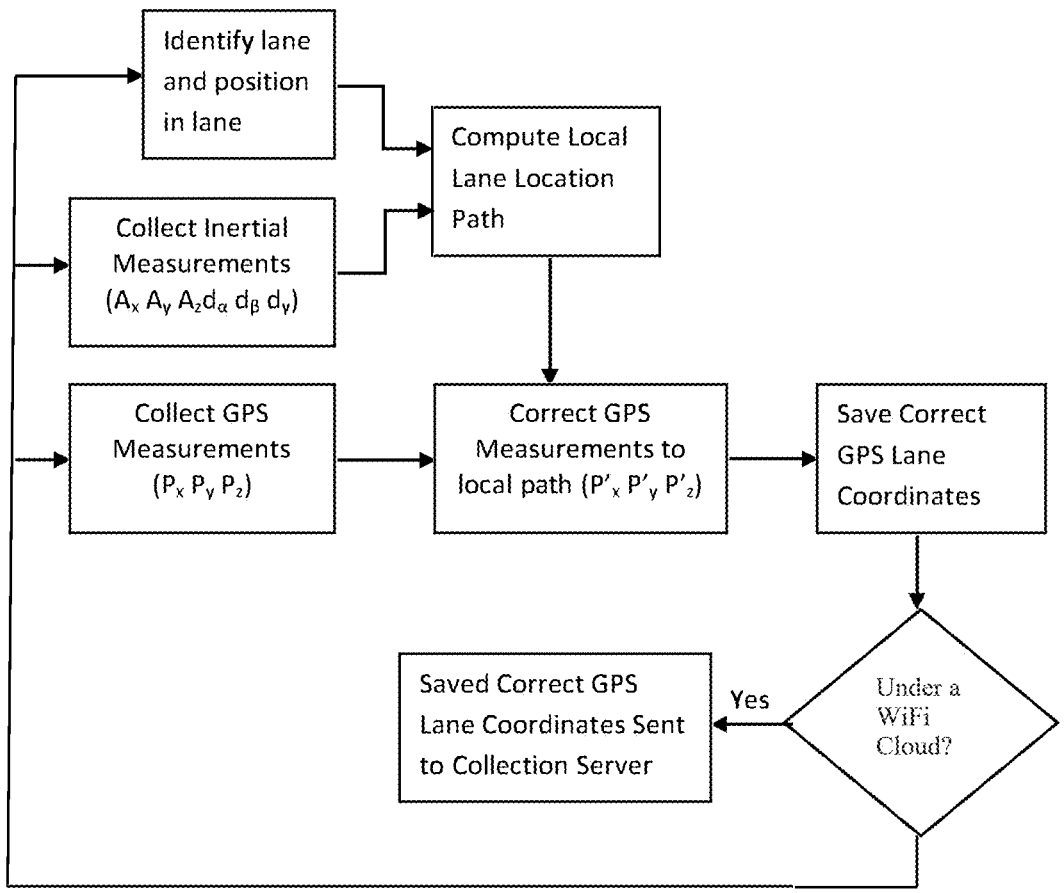
FIG. 2 illustrates how, using two constructs for localizing one set of GPS measurements over fairly long times along locally known drive paths is becomes possible to collect the necessary number of points for substantially reducing GPS error by curve fitting.
Figure 3:
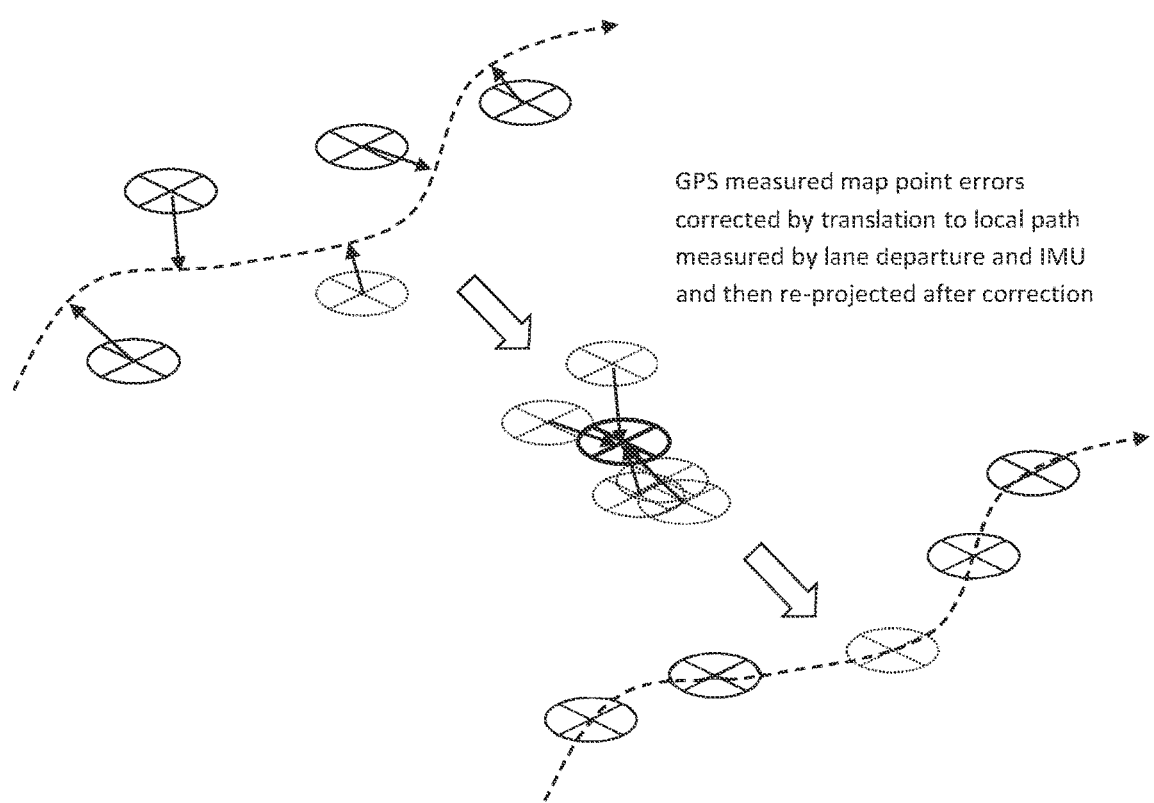
FIG. 3 shows how GPS measured map point errors are corrected by translation to local path measured by lane departure and IMU, then re-projected after correction.
Figure 4:
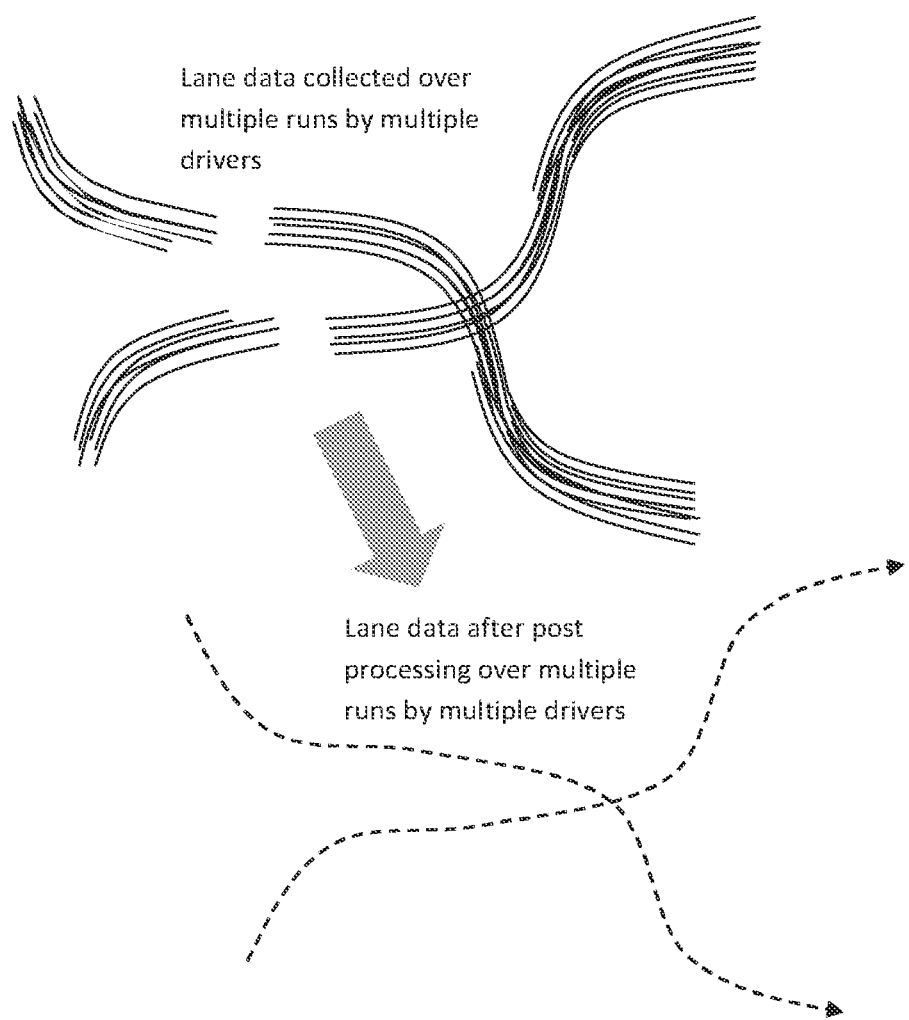
FIG. 4 shows how, in the case of multiple drives through the same basic road and lane path, it becomes possible to correlate the multiple drive point collections to achieve even more accurate track data for each track a vehicle is likely to drive, potentially over long distances.

Using these two constructs for localizing one set of GPS measurements over fairly long times along locally known drive paths is becomes possible to collect the necessary number of points for substantially reducing GPS error by curve fitting [FIG. 2]. Furthermore, in the case of multiple drives through the same basic road and lane path, it becomes possible to correlate the multiple drive point collections to achieve even more accurate track data for each track a vehicle is likely to drive, potentially over long distances [FIG. 3][FIG. 4].

Figure 5:
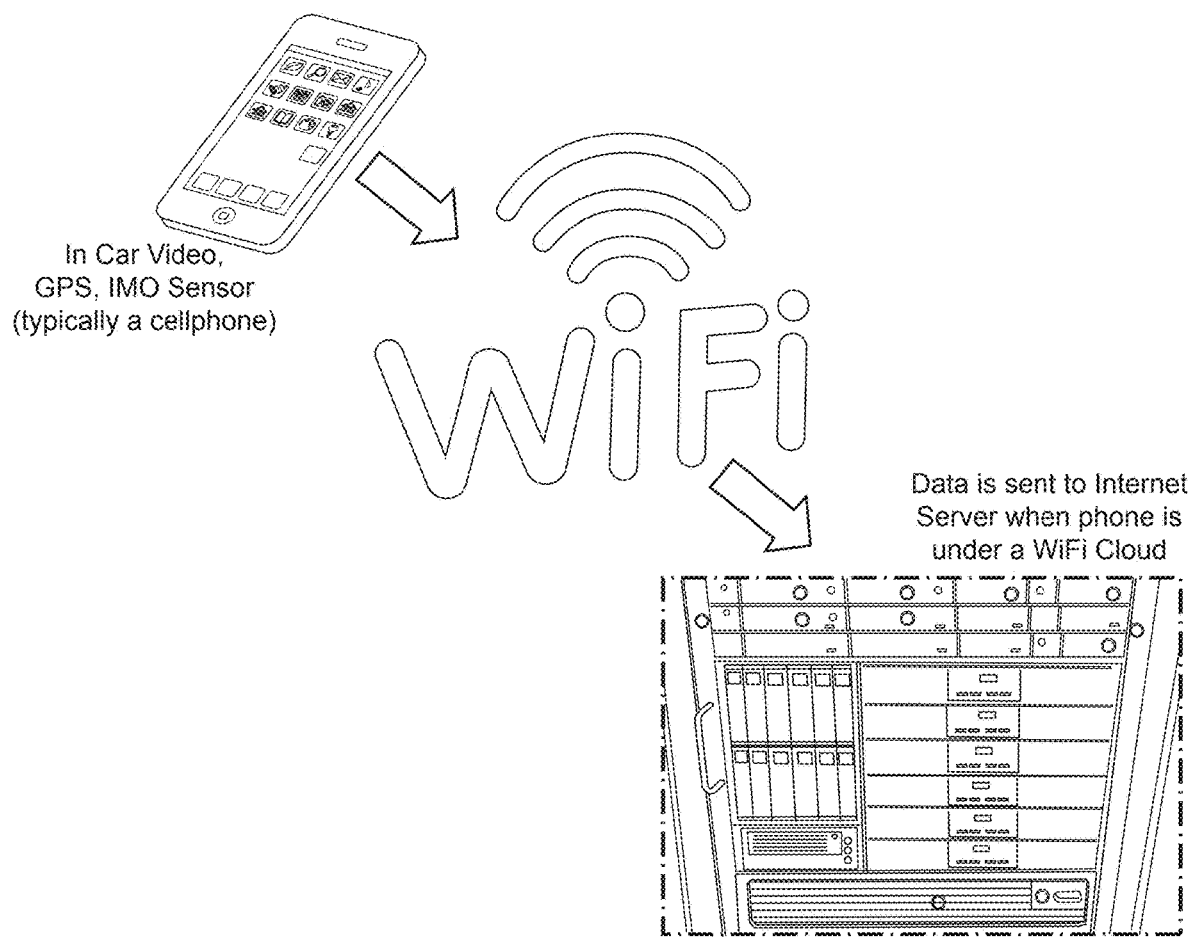
FIG. 5 depicts a system that also sends data to a central data repository for post processing whenever an enabled phone (or alternative data collection system with camera, GPS, and inertial measurement unit) passes under a WiFi cloud, thereby enabling low cost high speed data set transfer to the central collection and aggregation point.

So our system not only collects the GPS track data, the inertial data, and the lane position data, it also sends this data to a central data repository for post processing when-, ever an enabled phone (or alternative data collection system with camera, GPS, and inertial measurement unit) passes under a WiFi cloud, thereby enabling low cost high speed data set transfer to the central collection and aggregation point [FIG. 5].

By post processing fitting, and reformatting this data, we can build up precise maps, not only of road positions, but also lane locations within the roads by data collected by numerous drivers. Because drivers provide paths around transient road features like construction sites or traffic diversions, or over newly opened road and lane paths, within a short period of time we can either modify or update these precisions maps point sets without send out specific road survey crews.

Alternative Comparable Solutions

Figure 6:
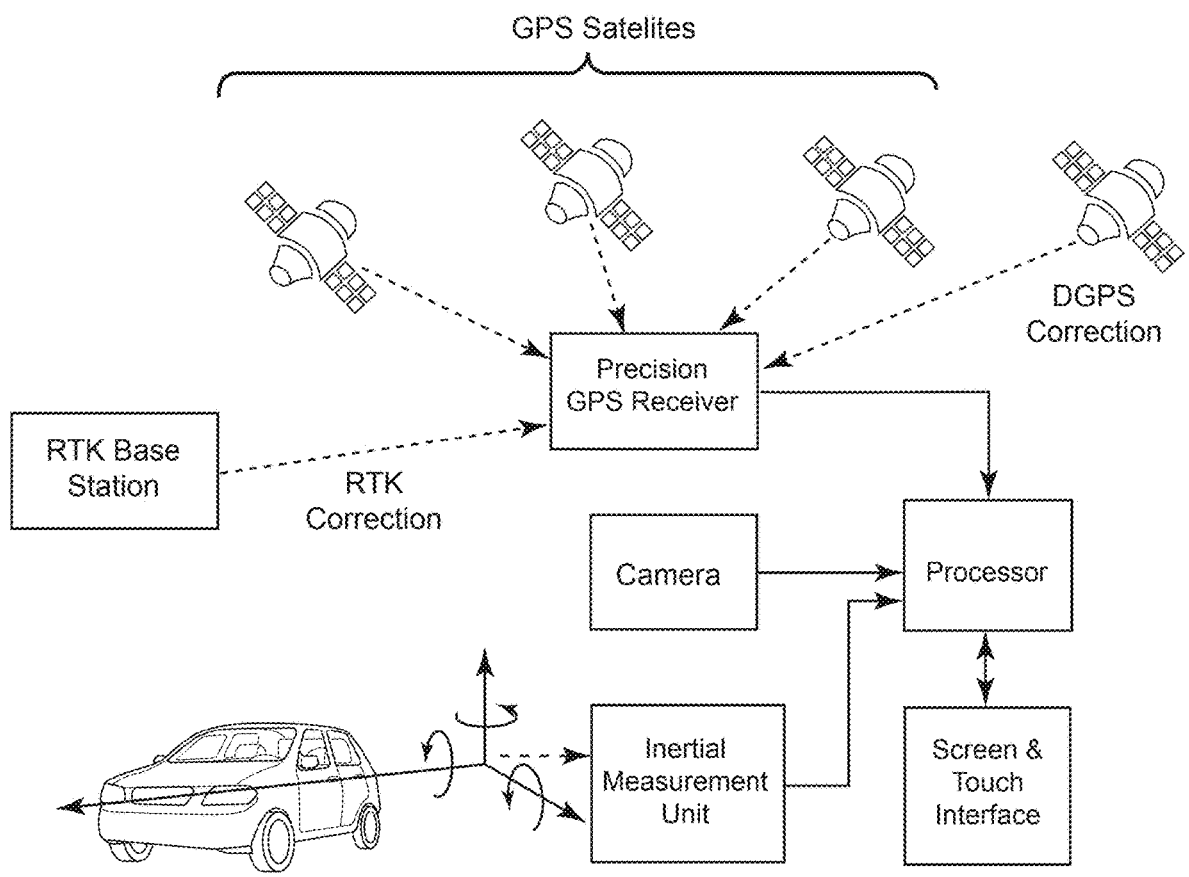
FIG. 6 shows how same data can be acquired by DGPS or RTK using GPS only.

The same data can be acquired by DGPS or RTK using GPS only, although one would be well advised to also include a similar IMU-based curve fitting approach because both RTK and DGPS sometimes are intermittent, leaving unmapped segments of the roadway. The disadvantage is that the smartphone presently does not provide these enhanced GPS features [FIG. 6].

It is possible to map roads by aerial or satellite overheated imagery. In both cases the location of the capture platform must be precisely known, and the camera must resolve down to nominally 20 cm. For aircraft, knowing location this precisely is challenging and for satellite, high enough camera resolution is challenging. In both cases human assisted identification of known ground landmarks and curve fitting can improve the data to the necessary degree, but the data collector must own satellite or aircraft and must have many ground survey analysts to provide the necessary data fitting and correction oversight.

Advantages of Our Lane Departure Approach

Figure 7:
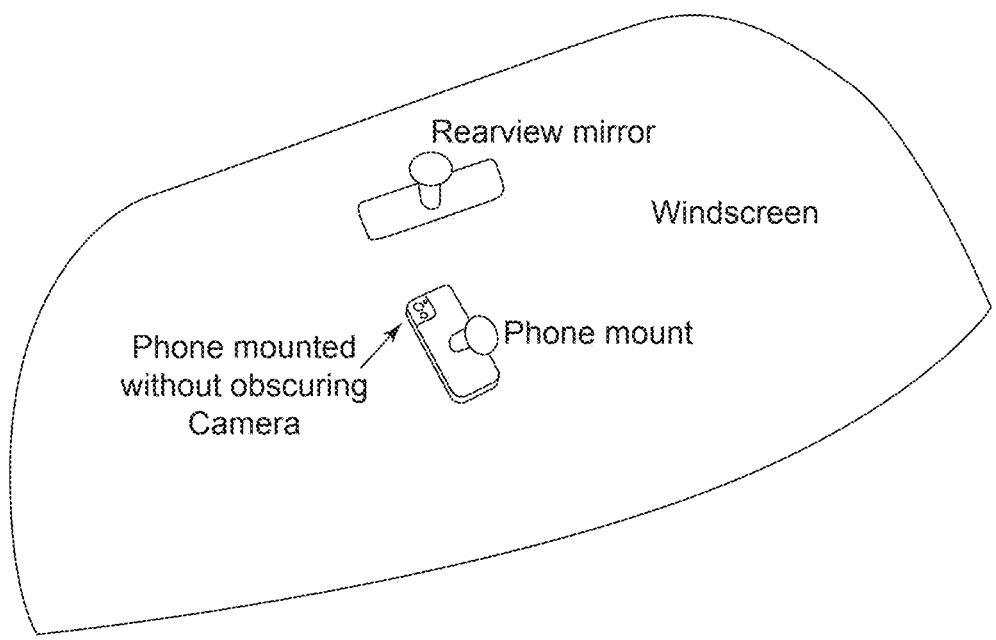
FIG. 7 illustrates an entire data collection part as part of an app in a smartphone mounted to the driver's windshield or dashboard.

The entire data collection part can be an app in a smartphone mounted to the driver's windshield or dash [FIG. 7]. The lane departure system can be used to provide automatic lane departure warnings or lane keeping steering automation (coupled with look-a-head object identification by either radar or also by phone camera, also speed control—with look-a-head sign finding, speed limit and other traffic control obeisance). Accordingly, the invention represents an advance towards fully automated driving of vehicles, familiarizing the driving public with the pros and cons of this new technology without investment in state-of-the-art vehicles that incorporate some or all of this technology in a vehicle proprietary manner.

What is claimed is:

1. A method of generating precise lane-level road map data, comprising the steps of:
    collecting raw GPS coordinates, via a plurality of GPS receivers associated with each respective vehicle of a plurality of vehicles as the plurality of vehicles travels along a road path defining the same road path traveled by each respective vehicle;
    defining raw road track data via the raw GPS coordinates acquired by each vehicle of the plurality of vehicles;
    receiving, via a processor connected to memory, the raw road track data from the plurality of vehicles;

applying, via the processor, an algorithm to the raw road track data to generate improved road track data defining the road path; and storing, via the processor, the improved road track data in a database for subsequent use by the same or different vehicles when traveling along the road path.

2. The method of claim 1, further comprising:

measuring acceleration and turn rate of the plurality of vehicles, via an inertial sensor, as the plurality of vehicles travels along the road path; and generating the raw road track data via the acceleration and turn rate of each vehicle of the plurality of vehicles.

3. The method of claim 1, further comprising:

acquiring image data from each vehicle of the plurality of vehicles, via a video camera, of the road path as the plurality of vehicles travel along the road path; and generating, via the image data, raw road track data for each vehicle of the plurality of vehicles.

4. The method of claim 3, wherein the video camera is integrated with the vehicle.

5. The method of claim 1, further comprising:

uploading, via the processor, the improved road track data to a central data repository for post processing.

6. The method of claim 5, further comprising:

uploading, via the processor, the improved road track data to a central data repository for post processing whenever at least one vehicle of the plurality of vehicles passes through a WiFi cloud.

7. The method of claim 2, further comprising:

improving the raw road track data with curve fitting using the acceleration and turn rate of the plurality of vehicles.

8. The method of claim 1, wherein the plurality of vehicles are autonomous vehicles.

9. A method of generating precise lane-level road map data, comprising the steps of:

collecting raw GPS coordinates, via a plurality of GPS receivers associated with each respective vehicle of a plurality of vehicles;

measuring acceleration and turn rate data, via an inertial sensor, as each vehicle of the plurality of vehicles travels along a road path;

defining raw road track data via the raw GPS coordinates and the acceleration and turn rate data, where the raw road track data defines the same road path travelled by each respective vehicle;

receiving, via a processor connected to memory, the raw road track data from the plurality of vehicles;

applying, via the processor, a curve fitting algorithm to the raw road track data to generate improved road track data defining the road path; and storing, via the processor, the improved road track data in a database for subsequent use by the same or different vehicles when traveling along the road path.

10. The method of claim 9, further comprising:

uploading, via the processor, the improved road track data to a central data repository for post processing.

11. The method of claim 10, further comprising:

uploading, via the processor, the improved road track data to a central data repository for post processing whenever the vehicle passes through a WiFi cloud.

12. The method of claim 9, wherein the plurality of vehicles are autonomous vehicles.

13. The method of claim 9, wherein the improved road track data includes transient road features.

14. The method of claim 13, wherein the transient road features include at least one of construction sites, traffic diversions, and newly opened road or lane paths.

15. A method of generating precise lane-level road map data, comprising the steps of:

collecting raw GPS coordinates, via a plurality of GPS receivers associated with each respective vehicle of a plurality of vehicles;

acquiring image data from each vehicle of the plurality of vehicles, via a video camera, of a road path as the plurality of vehicles travel along the road path;

defining raw road track data via the raw GPS coordinates and image data, wherein the raw road track data defines the same road path travelled by the plurality of vehicles;

receiving, via a processor connected to memory, the raw road track data from the plurality of vehicles;

applying, via the processor, a curve fitting algorithm to the raw road track data to generate improved road track data defining the road path; and storing, via the processor, the improved road track data in a database for subsequent use by the same or different vehicles when traveling along the road path.

16. The method of claim 15, wherein the video camera is integrated with the vehicle.

17. The method of claim 15, further comprising:

uploading, via the processor, the improved road track data to a central data repository for post processing.

18. The method of claim 15, further comprising:

uploading, via the processor, the improved road track data to a central data repository for post processing whenever the vehicle passes through a WiFi cloud.

19. The method of claim 15, wherein the plurality of vehicles are autonomous vehicles.

20. The method of claim 15, wherein the improved road track data includes transient road features.

* * * * *